US009739280B2

(12) United States Patent
Chikaoka (10) Patent No.: US 9,739,280 B2
(45) Date of Patent: Aug. 22, 2017

(54) ELECTRICALLY DRIVEN MOTOR AND ELECTRICALLY DRIVEN PUMP (71) Applicant: Hitachi Automotive Systems, Ltd., Hitachinaka-shi, Ibaraki (JP)

(72) Inventor: Takayuki Chikaoka, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 250 days.

(21) Appl. No.: 13/971,160

(22) Filed: Aug. 20, 2013

(65) Prior Publication Data
US 2014/0086766 A1   Mar. 27, 2014

(30) Foreign Application Priority Data

Sep. 26, 2012   (JP) ................................. 2012-211782
Mar. 12, 2013   (JP) ................................. 2013-049375

(51) Int. Cl.
*H02K 1/27*   (2006.01)
*H02K 29/03*  (2006.01)
(Continued)

(52) U.S. Cl.
CPC .............. *F04D 13/06* (2013.01); *F04C 2/102* (2013.01); *F04C 11/008* (2013.01);
(Continued)

(58) Field of Classification Search
CPC ........ F04D 13/06; F04C 2/102; F04C 11/008; F04C 15/008; H02K 1/27; H02K 1/2706; H02K 1/24; H02K 21/023; H02K 2201/03; H02K 1/278; H02K 29/03; H02K 7/14

USPC ......... 310/156, 156.12, 266, 156.05, 156.06, 310/156.32, 156.33, 156.34, 156.36, 310/156.37, 156.45, 156.46, 156.48, 310/156.49, 156.51, 156.52, 156.58, 310/156.59, 156.61, 68 B, 216.074, 310/216.091
See application file for complete search history.

(56) References Cited

U.S. PATENT DOCUMENTS 5,521,494 A  *  5/1996  Hore .................... G01D 5/2006
                                                          324/207.16
7,091,643 B2 *  8/2006  Burgbacher ............. 310/156.53
(Continued)

FOREIGN PATENT DOCUMENTS

JP    2006316652 A  * 11/2006
JP    2008236866 A  * 10/2008
JP    2008-295207 A   12/2008

OTHER PUBLICATIONS

Imai (JP 2008236866) English Translation, Pub. Oct. 2008.*
Kosugi (JP 2006316652) English Translation, Pub. Nov. 2006.*

*Primary Examiner* — Naishadh Desai
*Assistant Examiner* — Alexander Moraza
(74) *Attorney, Agent, or Firm* — Crowell & Moring LLP (57) ABSTRACT An electrically driven motor includes a motor rotor having a rotor core and a plurality of permanent magnets attached onto an outer circumferential portion of the rotor core. The electrically driven motor also includes a stator having a plurality of slots. In the electrically driven motor, a plurality of projections rotor teeth are disposed at positions of the outer circumferential portion of the rotor core which are spaced apart from each other by a predetermined interval of distance and which include a magnetic pole center of at least one permanent magnet. The plurality of rotor teeth extend all the way to a location of the teeth of the stator.

7 Claims, 8 Drawing Sheets (51) Int. Cl.
*F04D 13/06* (2006.01)
*H02K 7/14* (2006.01)
*F04C 2/10* (2006.01)
*F04C 11/00* (2006.01)
*F04C 15/00* (2006.01)

(52) U.S. Cl.
CPC ........... *F04C 15/008* (2013.01); *H02K 1/278* (2013.01); *H02K 7/14* (2013.01); *H02K 29/03* (2013.01); *H02K 1/276* (2013.01); *H02K 2201/03* (2013.01)

(56) References Cited

U.S. PATENT DOCUMENTS

| | | | |
|---|---|---|---|
| 2005/0279595 A1* | 12/2005 | Kallenbach | F16D 65/12 188/264 D |
| 2006/0163967 A1* | 7/2006 | Yamamoto et al. | 310/216 |
| 2009/0009019 A1* | 1/2009 | Li et al. | 310/156.01 |
| 2009/0127960 A1* | 5/2009 | Kawamura | H02K 1/278 310/156.43 |
| 2009/0140590 A1* | 6/2009 | Hung | 310/156.32 |
| 2009/0142208 A1* | 6/2009 | Rhein | F04C 2/102 417/410.3 |
| 2009/0195112 A1* | 8/2009 | Chai | H02K 1/148 310/216.086 |
| 2009/0212728 A1* | 8/2009 | Yagi | B60L 11/1803 318/437 |
| 2012/0019089 A1* | 1/2012 | Takemoto | H02K 1/276 310/156.54 |
| 2012/0025664 A1* | 2/2012 | Sanada | H02K 19/103 310/216.091 |
| 2013/0050871 A1* | 2/2013 | Tamaoka | H02K 21/16 360/99.08 |
| 2013/0113318 A1* | 5/2013 | Nishiyama | H02K 21/44 310/114 |

* cited by examiner

CROSS SECTIONAL VIEW FROM LINE B-B

CROSS SECTIONAL VIEW FROM LINE A-A

ELECTRICALLY DRIVEN MOTOR AND ELECTRICALLY DRIVEN PUMP

BACKGROUND OF THE INVENTION (1) Field of the Invention

The present invention relates to an electrically driven motor and an electrically driven pump using the motor.

(2) Description of Related Art

A high noise reduction in an electrically driven pump mounted in a vehicle such as an oil pump for an automatic transmission is demanded. Thus, a demand for a reduction of a cogging torque which provides a factor of noise generation is large. A Japanese Patent Application First Publication (tokkai) No. 2008-295207 published on Dec. 4, 2008 discloses a low cogging torque technique by means of a magnetized skew of permanent magnets of a rotor of the motor.

SUMMARY OF THE INVENTION

However, a magnetized skew has a problem to be solved in a complexity of an application of a segment magnet and a molding accuracy of a skew shaped stator core.

It is, therefore, an object of the present invention to provide an electrically driven motor and an electrically driven pump in which the cogging torque can be reduced in a simple structure not using the magnetized skew.

According to one aspect of the present invention, there is provided with an electrically driven motor, comprising: a motor rotor having a rotor core and a plurality of permanent magnets attached onto an outer circumferential portion of the rotor core; and a stator having a plurality of slots, wherein a plurality of projections are disposed at positions of the outer circumferential portion of the rotor core which are spaced apart from each other by a predetermined interval of distance and which include a magnetic pole center of at least one permanent magnet.

According to another aspect of the present invention, there is provided with an electrically driven pump comprising: an electrically driven motor; and a pump rotor having a plurality of teeth connected to a drive shaft of the electrically driven motor and which converts a transmitted torque into a fluid discharge work, wherein the electrically driven motor is an application of the electrically driven motor described in the claim 1.

DETAILED DESCRIPTION OF THE INVENTION

First Embodiment

Figure 1:
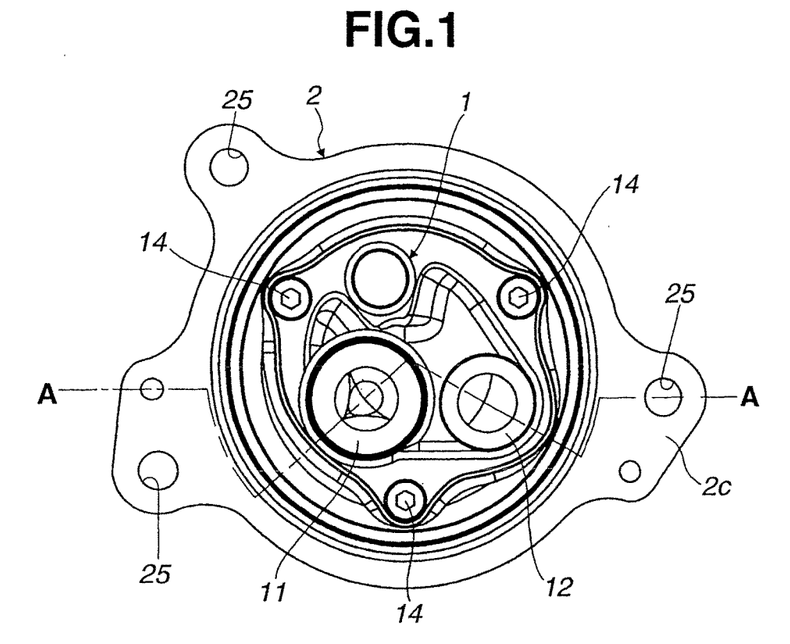
FIG. 1 is a front view of an electrically driven pump in the first preferred embodiment according to the present invention.
Figure 2:
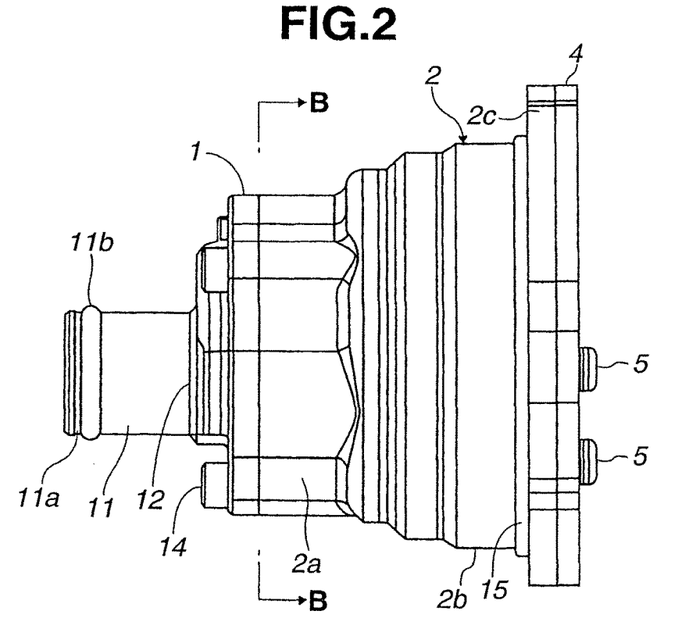
FIG. 2 is a side view of the electrically driven pump in the first embodiment according to the present invention.
Figure 3:
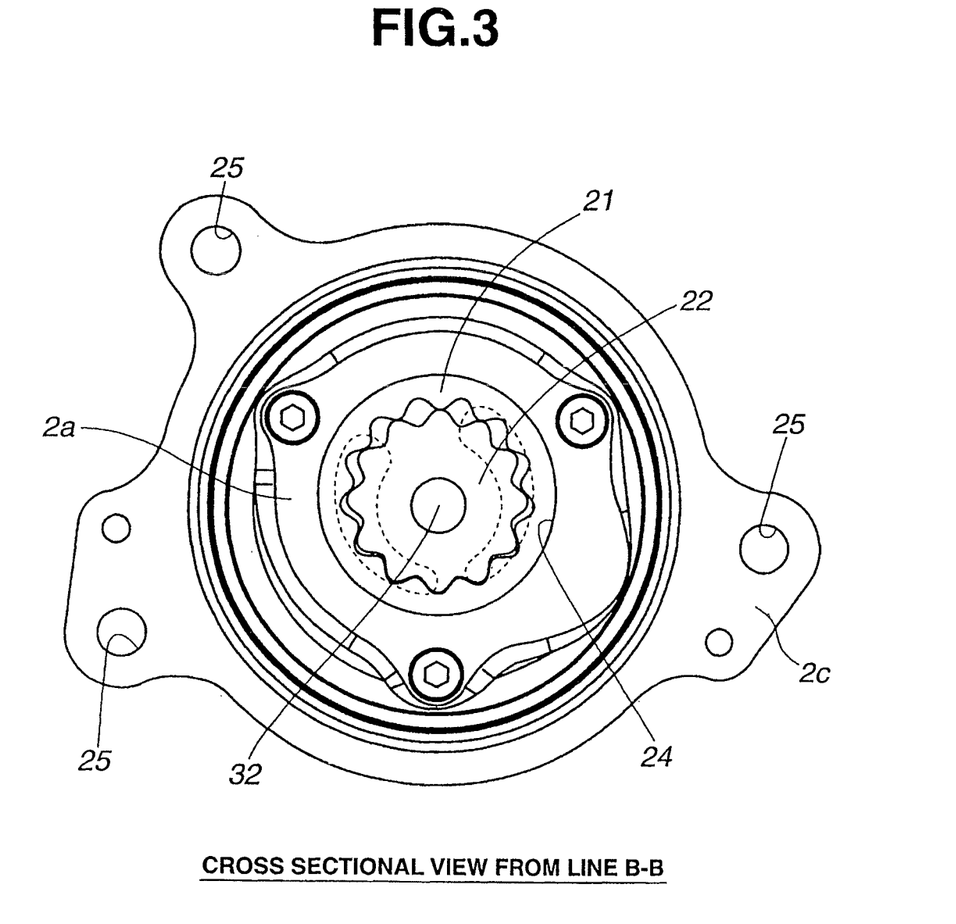
FIG. 3 is a cross sectional view of the electrically driven pump cut away along a line B to B in FIG. 2.
Figure 4:
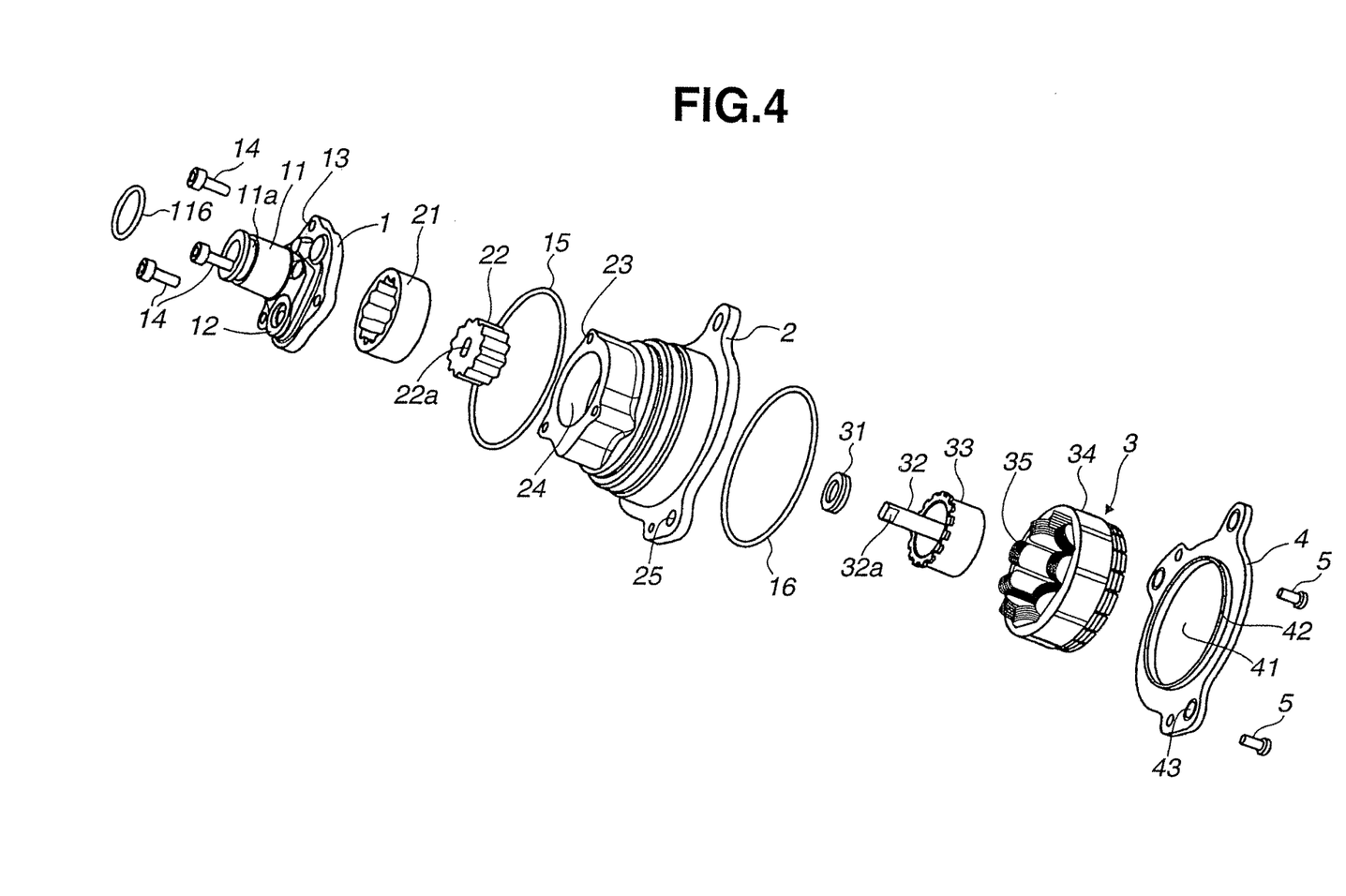
FIG. 4 is an exploded perspective view of the electrically driven pump in FIGS. 1 through 3.
Figure 5:
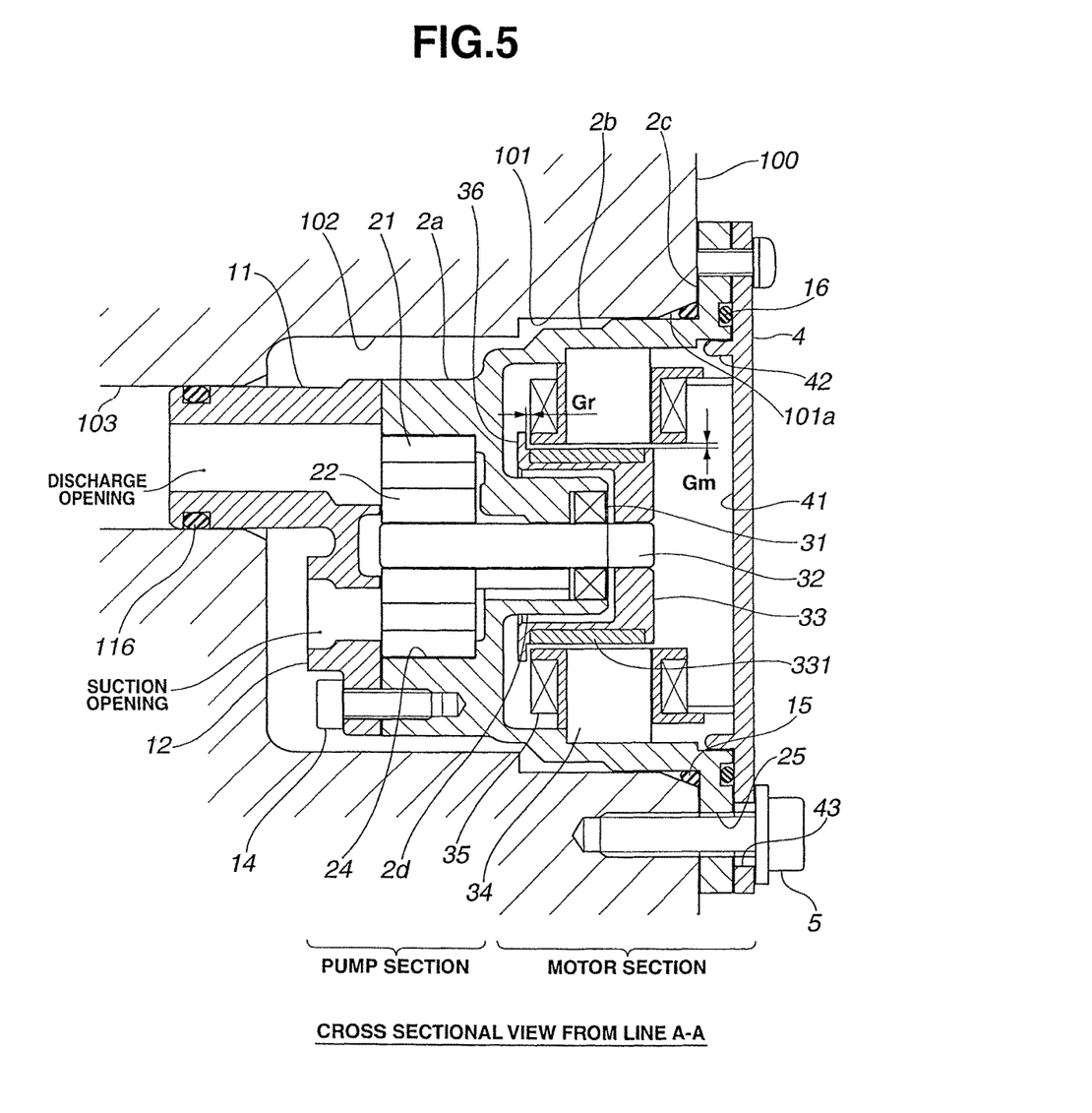
FIG. 5 is a cross sectional view of the electrically driven pump cut away along a line A to A of the electrically driven pump in FIGS. 1 through 4.
Figure 6:
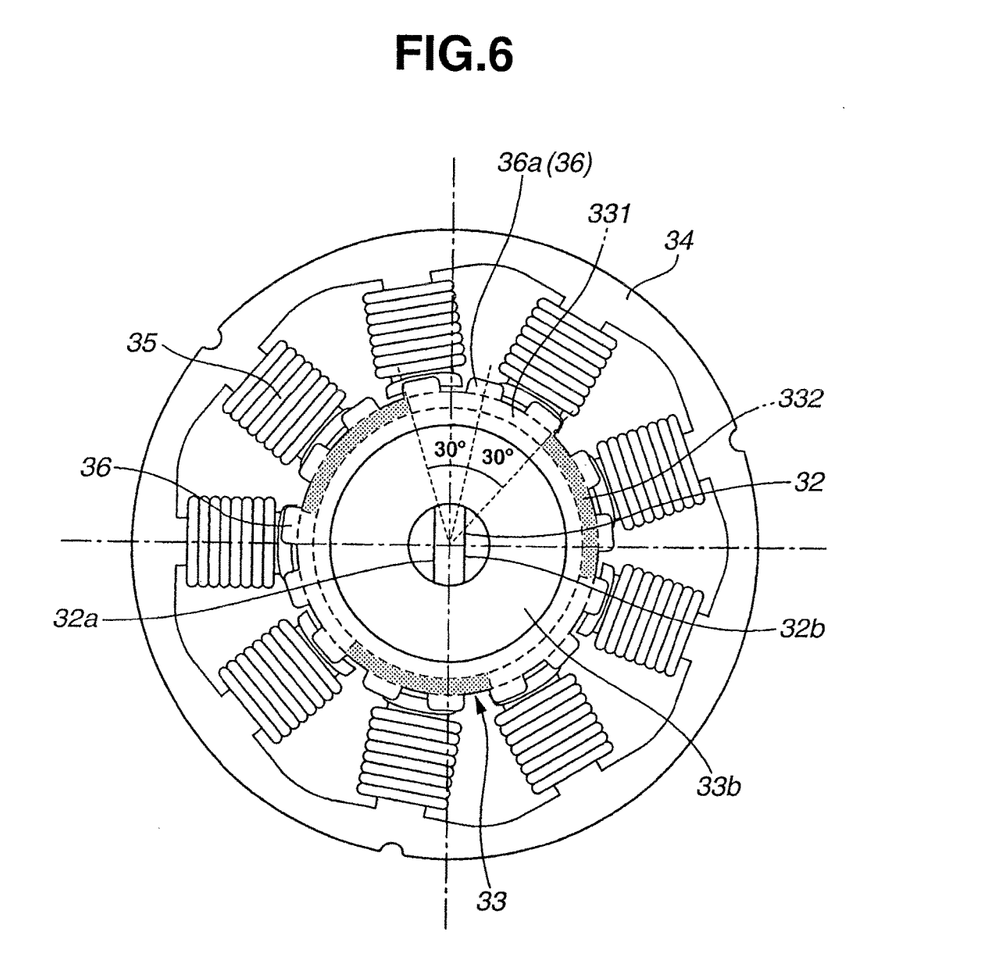
FIG. 6 is a front elevational view of a motor section in the first embodiment according to the present invention.

FIG. 1 shows a front view of an electrically driven pump in a first preferred embodiment according to the present invention. FIG. 2 shows a side view of the electrically driven pump in the first embodiment. FIG. 3 shows a cross sectional view of the electrically driven pump in the first embodiment cut away along a line B-B in FIG. 2. FIG. 4 shows an exploded perspective view of the electrically driven pump in the first embodiment. FIG. 5 shows a cross sectional view of the electrically driven pump in the first embodiment cut away along a line A-A in FIG. 1. FIG. 6 shows a front view of a motor section in the first embodiment. The electrically driven pump in the first embodiment is a pump mounted for an automatic transmission of a vehicle having an idle stop function. This automatic transmission is a belt type continuously variable transmission and a main pump driven by means of an engine is separately equipped. In addition, when, during a stop of the engine under an idle stop control, a hydraulic pressure due to the main pump cannot be secured and when the hydraulic pressure is reduced according to a leak from a frictional engagement element and the pulley within the belt continuously variable transmission, a reduction of driveability is introduced since it takes a lot of time until the hydraulic pressure required for a restart of the vehicle is secured. Therefore, separately from the main pump, the electrically driven pump is equipped which is dischargeable irrespective of an operation state of the engine so that the hydraulic pressure is secured for the leak from the frictional engagement element and for the pulley. Thus, driveabilities of an engine restart and a restart of the vehicle are improved.

The electrically driven pump in the first embodiment includes: a pump element constituted by a pump rotor 22 having outer teeth and an outer rotor 21 having inner teeth and a motor element (an electrically driven motor) constituted by a motor rotor 33 and a stator 3 connected to pump rotor 22. These pump element and motor element are housed in a single center housing 2. Center housing 2 has an opening at each of both ends of center housing 2 toward an axial outward direction and a cylindrical pump housing section 2a is formed on one opening inner periphery on which a pump element housing section 24 to house rotatably an outer rotor 21 is formed. A motor housing section 2b to house a rotor motor at an inner part together with a fixture support of stator 3 on the other opening inner periphery. In addition, a bracket 2c to be attached onto the automatic transmission is formed at an axial direction outer side than motor housing section 2b. Furthermore, as shown in FIG. 5 which is the cross sectional view cut away along a line A-A in FIG. 2, an inside of center housing 2 includes: a cylindrical supporting section 2d which rotatably supports rotor drive axle 32; and a partitioning wall linking cylindrical supporting section 2d with an outer circumferential portion of center housing 2 and defining a space between pump housing section 2a and motor housing section 2b. Then, a rotor drive shaft 32 is supported on an inner periphery of cylindrical supporting section 2d and a seal member 31 which seals between rotor drive axle 32 and the inner periphery of cylindrical supporting section 2d is installed on the inner periphery of cylindrical supporting section 2d.

Pump cover 1 includes a discharge port 11 which is communicated with a discharge region of the pump element and extended in a cylindrical shape and a suction port 12 communicated with a suction region of the pump element. A seal ring groove 11a to which a seal ring 11b is attached is formed on a tip outer circumferential portion of discharge port 11. In addition, bolt holes 13 are formed on three positions in a circumferential direction of pump cover 1 and bolts 13, 13, 13 serve to tighten and fix bolt holes 23, 23, 23 formed on center housing 2. A motor cover 4 closing motor housing section 2b includes: a closure surface 41 closing motor housing section 2b; a cylindrical vertical installing section 42 vertically installed from closure surface 41 and inserted into an inner wall of motor housing section 2b; and a flange surface 43 contacted on a flange surface of bracket 2c to press seal member 16 under pressure and having penetrated holes through which bolts 5, 5 are penetrated. Thus, a dry chamber is constituted by the inside of motor housing section 2b and a wet chamber is constituted by the inside of pump housing section 2a and the outer circumferential portion of the pump.

The pump element includes: a pump rotor 22 having an outer teeth number Nr=12; and an outer rotor 21 having an inner teeth number of 13. Pump rotor 22 is formed with a linkage hole 22a having width across flats at a center thereof and which is fitted into width across flats 32a formed at the end section of the pump side of rotor drive shaft 32. Thus, a rotational direction relative position between rotor drive shaft 32 and pump rotor 22 is determined and a power transmission is carried out.

The motor element includes motor rotor 33 having the number of magnetic poles Nm=6 and stator 3 having the number of slots Ns=9. Coils 35, 35, . . . are wound on nine teeth formed on stator core 34 of stator 3. Six motor cores 33 are attached with respect to rotor core 33b which is the cylindrical member of an approximately letter C shape of cross section and N pole permanent magnets 331 and S pole permanent magnets 332 are aligned along the outer circumferential portion of motor rotor 33 with respect to rotor core 33b. Linkage hole 33a having the width of cross flats is formed at the center of the supporting surface closing the envelope of motor rotor 33 and fitted into the width of cross flats 32b formed at the motor side end section of rotor drive shaft 32. Thus, a rotational directional relative position between rotor drive shaft 32 and motor rotor 33 are determined and the power transmission is carried out.

In the first embodiment, fifteen rotor teeth 36 (projections) are disposed on the outer circumferential portion of motor rotor 33 in order to aim at reducing a cogging torque. Rotor teeth 36 are disposed on an outer circumferential surface of motor rotor 33 at predetermined intervals of distances. As shown in FIG. 5, rotor teeth 36 are positioned toward the pump side than coils 35 of stator 3. Its tip of rotor teeth 36, as shown in FIG. 5, is positioned toward a more outer circumferential side than the inner diameter of stator 3. In other words, rotor teeth 36 are overlapped in the radial direction with respect to stator 3. In addition, an axial directional air gap (axial air gap) Gr between rotor teeth 36 and stator 3 is set to be smaller than a radial air gap (radial air gap) Gm between permanent magnets 331, 332 and stator 3. In addition, as shown in FIG. 6, at least one rotor teeth 36a from among the plurality of rotor teeth 36 is arranged at the center of the magnetic pole (magnetic flux maximum section and the peripheral center position of permanent magnet 331). In other words, the center of the magnetic pole is arranged at the center position of the circumferential direction of rotor teeth 36a.

As shown in FIG. 5, an electrically driven pump housing section which houses the electrically driven pump is formed on a housing 100 of the automatic transmission. Specifically, the electrically driven pump housing section includes: a discharge oil passage 103 which supplies the hydraulic pressure to a control valve unit (not shown; a suction oil passage opening section 102 communicated with suction port 12 in a state in which the pump section of the electrically driven pump is housed; a pump supporting opening 101 having a diameter formed to be larger than suction oil passage opening section 102 and having the substantially the same diameter as an outer circumferential portion of motor housing section 2b of center housing 2; and a tapered surface 101a formed at an opening edge at an outside of housing 100 of pump supporting opening 101. Discharge oil passage opening section 102 is a cylindrical space formed at a position enclosing discharge oil passage 103 and communicated with an oil suction opening opened within an oil pan (not shown). In addition, the electrically driven pump is radially supported by fitting pump supporting opening 101 into the outer circumferential portion of motor housing section 2b. In addition, tapered surface 101a grasps seal ring 15 against the outer circumferential portion of motor housing section 2b. The electrically driven pump is tightened and fixed to the side wall of housing 100 by means of bolts 5, 5.

Next, an action of the first embodiment will be explained.

[Action to Reduce the Cogging Torque]

In the first embodiment, rotor teeth 36 are disposed on the outer circumferential portion of rotor core 33b. Hence, a leakage magnetic flux from permanent magnets 331, 332 fixed onto motor rotor 33 is caused to flow to stator 33 via rotor teeth 36 to form a magnetic circuit. Thus, the magnetic flux caused to flow through stator 3 via rotor teeth 36 is decreased as compared with a case where the magnetic flux is not caused to flow through rotor teeth 36. At this time, if rotor teeth 36 is present at a position having a large magnetic flux, a magnetic flux variation due to a rotation of motor rotor 33 is homogenized due to a decrease in the magnetic flux. A magnitude of the magnetic flux variation is a magnitude of the cogging torque so that the homogenization of the magnetic flux variation can reduce the cogging torque.

As described above, the cogging torque can be reduced by forming a magnetic circuit between rotor teeth 36 and stator 3 and homogenizing the magnetic flux variation can reduce the cogging torque. Then, rotor teeth 36 is a simple structure that is easily enabled to be formed by working an end edge of rotor core 33b. Hence, the cogging torque can be reduced in a simple structure without use of the magnetized skew.

In addition, since, in the first embodiment, the radial overlap of rotor teeth 36 with respect to stator 3 is made. Hence, it is possible to arrange rotor teeth 36 in a proximity to stator 3. Hence, axial directional air gap Gr is made small so that an effective magnetic flux to stator 3 can be increased. Thus, while the cogging torque is reduced, the back electromotive force constant can be secured. In addition, axial air gap Gr is made smaller than radial air gap Gm so that the effective magnetic flux to stator 3 can be increased. Thus, in the same way as described above, while the cogging torque is reduced, the back electromotive force constant can be secured.

[Consideration of Rotor Teeth Number]

Figure 7A:
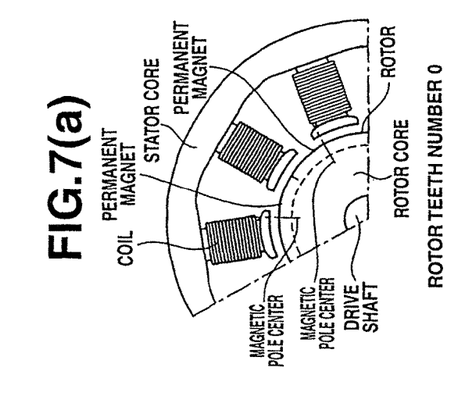
FIGS. 7(a) through 7(f) are an example of varying a number of rotor teeth with respect to a magnetic pole.
Figure 7B:
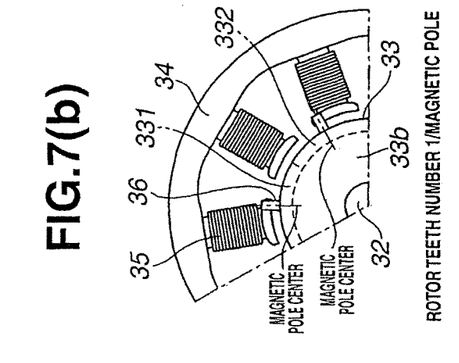
Figure 7C:
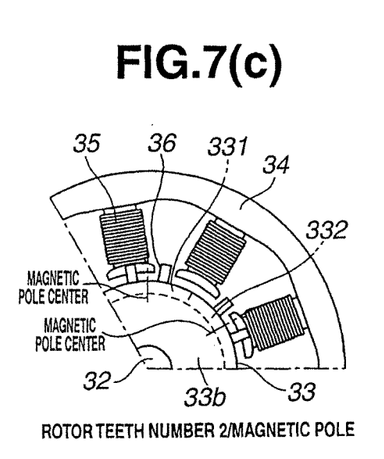
Figure 7D:
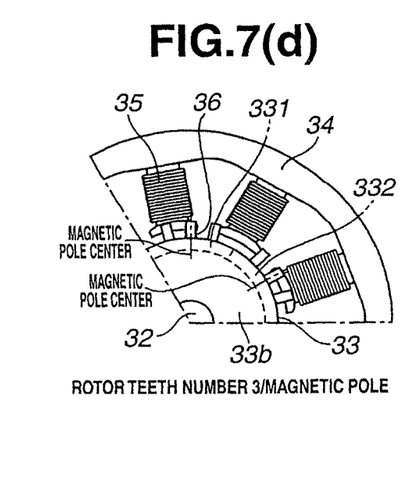
Figure 7E:
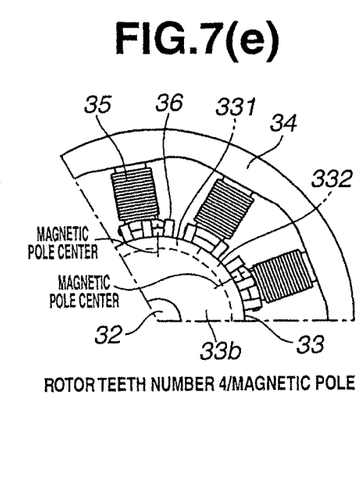
Figure 7F:
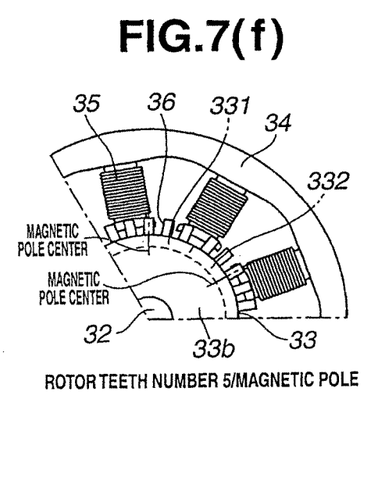

Next, an experiment result of the cogging torque and back electromotive force constant will be explained when the number of rotor teeth with respect to the magnetic pole is varied. As shown in FIGS. 7(a) through 7(f), the number of rotor teeth with respect to the magnetic pole is varied. FIG. 7(a) shows a case where no rotor teeth is present, FIG. 7(b) shows a case where the number of rotor teeth is 1 per magnetic pole, FIG. 7(c) shows a case where the number of rotor teeth is 2 per magnetic pole, FIG. 7(d) shows a case where the number of rotor teeth is 3 per magnetic pole, FIG. 7(e) shows a case where the number of rotor teeth is 4 per magnetic pole, and FIG. 7(f) shows a case where the number of rotor teeth is 5 per magnetic pole. It should be noted that FIGS. 7(b), 7(d), and 7(f) show a case where rotor teeth 36 are positioned over centers of magnetic poles and FIGS. 7(c) and 7(e) show a case where rotor teeth 36 are deviated from the center of the magnetic pole.

Figure 8:
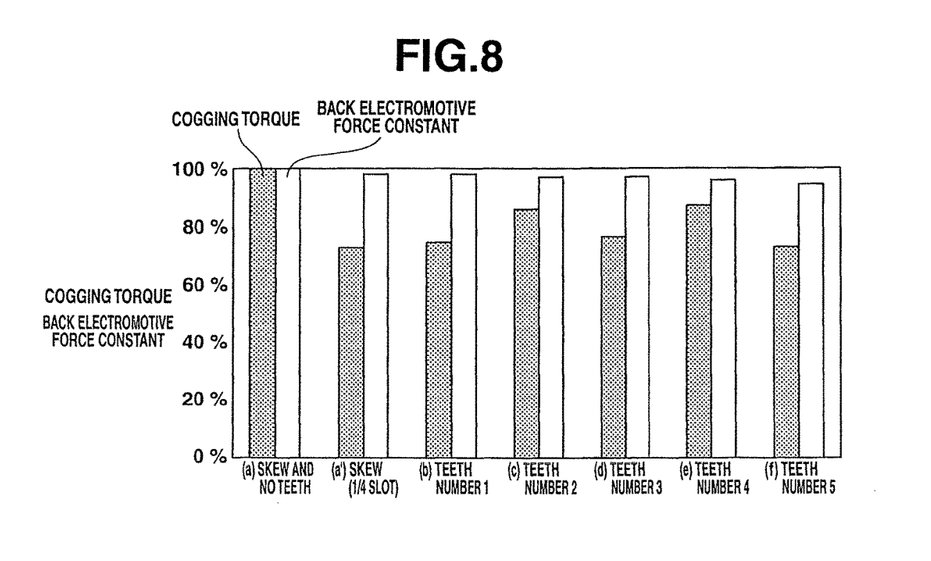
FIG. 8 is an experimental result of a cogging torque and a back electromotive force constant.

The measurement results of the cogging torque and back electromotive force constant in the case of FIGS. 7(a) through 7(f) are shown in FIG. 8. It should be noted that an example of the electrically driven pump in which a conventional magnetized skew (¼ slot) is adopted is shown in FIG. 8 as (a)'. A most effective in the reduction of the cogging torque is, in general, 1 slot or ½ slot. However, since the reduction of the electromotive force constant is large, the magnetized skew of a ¼ slot having the large cogging torque reduction width with the back electromotive force constant substantially equal to the conventional electrically driven motor secured.

As appreciated from FIG. 8, since rotor teeth 36 described in the first embodiment is adopted, the cogging torque is reduced as compared with the case of the electrically driven motor in which no rotor teeth is present. Then, the reduction width of the cogging torque in the electrically driven motor in which rotor teeth 36 is adopted is equal to the reduction width of the cogging torque of the previously proposed motor in which the magnetized skew is adopted and it will be appreciated that the back electromotive force constant is so as to be maintained to be equal to the same value.

In addition, as compared with the case shown in the cases of (b), (d), and (f) in FIG. 8 in which rotor teeth 36 is on the magnetic pole center, in the cases of (c) and (e) in which rotor teeth 36 are placed at positions out of the magnetic pole center, the reduction width of the cogging torque is small. This is supposed that the variation of the change in the magnetic flux affects the reduction width of the cogging torque. Thus, by arranging at least one rotor teeth 36a from among rotor teeth 36 is arranged at the magnetic pole center (the maximum position of the magnetic flux) as described in the first embodiment so that the variation of the change in the magnetic flux due to the rotation of motor rotor 33 can be suppressed and the cogging torque can effectively be reduced.

As described above, in the electrically driven pump in the first embodiment, the motor element is provided which can effectively reduce the cogging torque while the reduction in the back electromotive force is suppressed. Hence, it is suitable for the vehicular electrically driven pump which is actuated at a scene requiring (demanding) a high quietness at the time of an engine stop.

[Consideration of Teeth (or Tooth) Angle to Magnetic Pole Angle]

Figure 9:
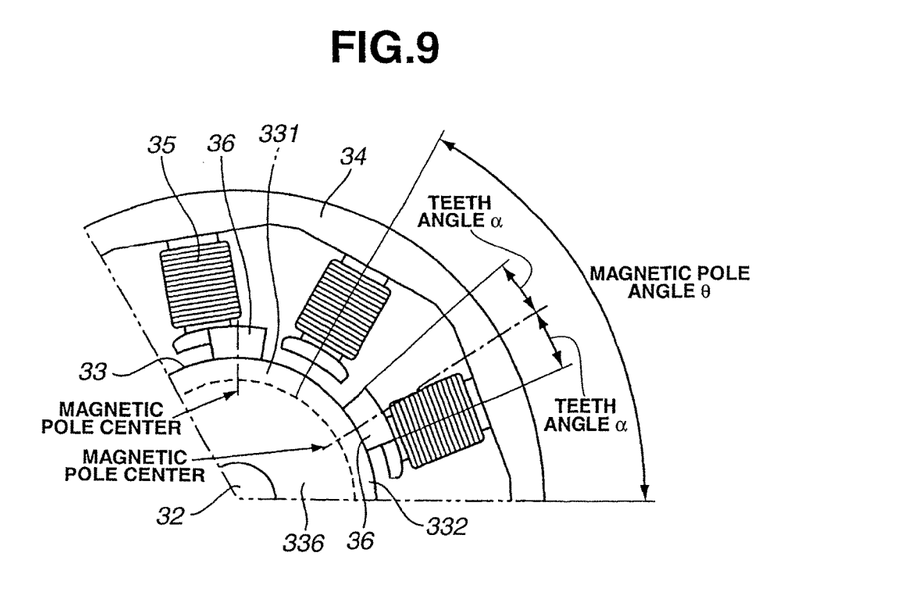
FIG. 9 is a front view of a motor section representing a relationship between a magnetic pole angle and a teeth (or tooth) angle.

Next, an experimental result of the cogging torque and the back electromotive force constant when a rotor teeth width is varied to a magnetic pole angle will be explained. FIG. 9 is an example of the electrically driven motor in which the rotor teeth number 1/magnetic pole and all of rotor teeth 36 are arranged at the center of magnetic pole, for motor rotor 33 of magnetic pole angle θ=60 [deg], namely, magnetic pole number of Nm=6. If an angle from the magnetic pole center to one of circumferential end edges of rotor teeth 36 is defined as a teeth angle (or tooth angle) α [deg] and a ratio (α/θ) of teeth angle α with respect to magnetic pole angle θ is defined as a teeth angle (or tooth angle) ratio, the series of cogging torques and back electromotive force constants when teeth angle ratio α/θ is varied are measured and the result of measurements are shown in FIG. 10.

Figure 10:
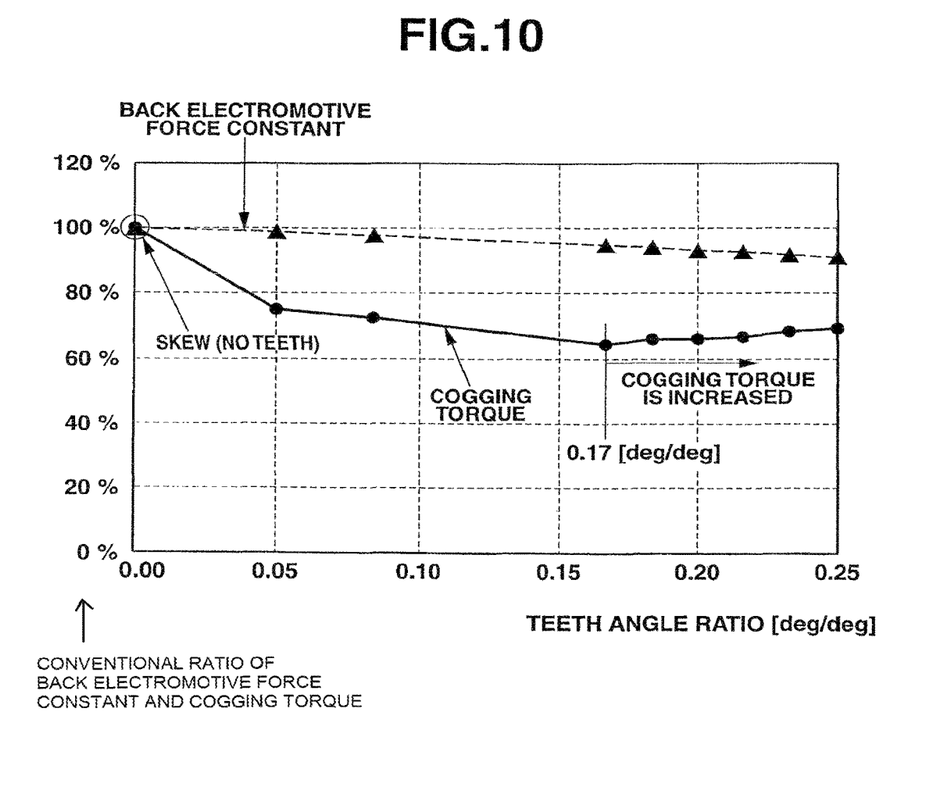
FIG. 10 is an experimental result of a cogging torque and a back electromotive force constant when a teeth angle (or tooth angle) ratio is varied.

As shown in FIG. 10, the back electromotive force constant has a tendency such that, as teeth angle ratio α/θ becomes large, the back electromotive force constant becomes reduced, as compared with a case where teeth angle ratio α/θ is 0 (100%), namely, the rotor teeth number is 0. On the other hand, the cogging torque tends to become reduced as teeth angle ratio α/θ becomes large in a region in which 0<(α/θ)≥0.17. However, in the region of (α/θ)<0.17, the cogging torque tends to be increased as teeth angle ratio α/θ becomes large. It should be noted that, in a case where magnetic pole angle θ and rotor teeth number/magnetic pole are made different in the case of the structure as shown in FIG. 9, the same measurement result could be obtained.

It was found out from the measurement result shown in FIG. 10 by the inventors that the cogging torque is turned from the increase tendency to the decrease tendency when teeth angle (or tooth angle) α with respect to magnetic pole angle θ is increased and teeth angle (or tooth angle) ratio α/θ exceeds a predetermined value, namely, 0.17.

Hence, in a case where a compatibility between the maintenance of the back electromotive force constant and the reduction of the cogging torque is considered, it is necessary to set teeth (or tooth) angle of α to make the teeth angle ratio (α/θ) fall in the region of 0<(α/θ)≥0.17. For example, in the example of FIG. 9, since magnetic pole angle is θ=60 [deg], teeth angle α is set to become equal to or below 10.2 [deg]. Thus, the compatibility between the maintenance of the back electromotive force constant and the reduction of the cogging torque can be maintained so that the cogging torque can effectively be reduced.

As described above, in the electrically driven pump in the first embodiment, the motor element is provided which can effectively reduce the cogging torque while the reduction in the back electromotive force is suppressed. Hence, it is suitable for the vehicular electrically driven pump which is actuated at a scene requiring (demanding) a high quietness at the time of an engine stop.

The following effects can be achieved in the first embodiment.

(1) The electrically driven motor having rotor motor 33 in which a plurality of permanent magnets 331, 332 are attached on an outer circumferential portion of rotor core 33b and a stator 3 having a plurality of slots, a plurality of projections being disposed at positions by predetermined intervals of distances including the pole center of at least one permanent magnet and the number of projections per number of magnetic pole being set to an odd number.

Hence, the variation of the magnetic flux due to the rotation of the permanent magnet is homogenized due to a partial decrease of the magnetic flux to stator 3 so that the cogging torque can be reduced. Then, rotor teeth 36 is a simple structure easily formable by working one end or both end edges of rotor core 33b. Hence, the cogging torque can be reduced in the simple structure using no magnetized skew.

(2) Since rotor teeth 36 are radially overlapped with respect to stator 3, the leakage magnetic fluxes of permanent magnets 331, 332 are effectively utilized so that the cogging torque can be reduced and, simultaneously, the back electromotive force constant can be secured.

(3) The axial air gap between rotor teeth 36 and stator 3 is set to be smaller than the radial air gap between permanent magnets 331, 332 and stator 3. Hence, the leakage magnetic flux of permanent magnets 331, 332 can effectively be utilized to reduce the cogging torque and the back electromotive force constant can be secured.

(4) In the electrically driven pump comprising the motor element and the pump element having pump rotor 22 having a plurality of teeth connected to rotor drive axle 32 of the motor element to convert the transmitted torque to a fluid discharge work, the motor elements described in (1) through (3) are applied as the motor element. Hence, the electrically driven pump described above which is operated during the scene in which the high quietness is demanded during the time at which the engine is stopped is suitable as the vehicular electrically driven pump.

Other Embodiment

As described hereinabove, the present invention has been described in terms of the first preferred embodiment. However, specific structures of the electrically driven motor and pump are not limited to the first embodiment described above. Various design modifications may be made without departing from the scope and sprit of the present invention which is to be defined in the appended claims.

For example, although, in the first embodiment, the rotor teeth (projection) are disposed on only end edges of one side in the axial direction of the motor rotor, the rotor teeth may be disposed at both end edges in the axial direction of the motor rotor.

According to the present invention, the magnetic flux to the stator is partially decreased at the projections so that the variation of the magnetic flux is homogenized due to the rotation of the permanent magnets and the cogging torque can be reduced. Then, since the projections are simple structure, the cogging torque can be reduced in the simple structure not using the magnetized skew.

This application is based on prior Japanese Patent Applications Nos. 2012-211782 and 2013-049375 filed in Japan on Sep. 26, 2012 and on Mar. 12, 2013. The entire contents of the two Japanese Patent Applications Nos. 2012-211782 and 2013-049375 are hereby incorporated by reference. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. An electrically driven motor, comprising:
a motor rotor having a generally annular rotor core and a plurality of permanent magnets coaxially attached onto an outer circumferential portion of the rotor core; and
a stator having a plurality of slots, wherein
a plurality of rotor teeth that are disposed at positions of the outer circumferential portion of the plurality of permanent magnets which are spaced apart from each other by a predetermined interval of distance in a circumferential direction of the plurality of permanent magnets and which include a magnetic pole center of at least one of the plurality of permanent magnets, and each of the plurality of rotor teeth extends in a radial direction of the motor rotor exceeding a position of a tip of the stator, and
an axial air gap between each of the plurality of rotor teeth and the stator is made smaller than a radial air gap between each of the permanent magnets and the stator.

2. The electrically driven motor as claimed in claim 1, wherein, when an angle from one of the plurality of rotor teeth which is disposed on the magnetic pole center of a corresponding one of the permanent magnets to each of peripheral end edges of the corresponding one of the plurality of rotor teeth is assumed to be a teeth angle and a ratio of the teeth angle to a magnetic pole angle of each of the permanent magnets is assumed to be a teeth angle ratio, the teeth angle is set to a value equal to or smaller than a predetermined value at which a cogging torque characteristic with respect to the teeth angle ratio changes from an increase tendency to a reduction tendency.

3. The electrically driven motor as claimed in claim 1, wherein, when an angle from one of the plurality of rotor teeth which is disposed on the magnetic pole center of a corresponding one of the permanent magnets to each of peripheral end edges of the corresponding one of the plurality of rotor teeth is assumed to be a teeth angle and a ratio of the teeth angle to a magnetic pole angle of each of the permanent magnets is assumed to be a teeth angle ratio, the teeth angle is set to a value equal to or smaller than a predetermined value at which a cogging torque characteristic with respect to the teeth angle ratio changes from an increase tendency to a reduction tendency.

4. An electrically driven pump comprising:
a pump rotor having a plurality of teeth connected to a drive shaft of an electrically driven motor and which converts a transmitted torque into a fluid discharge work, and
the electrically driven motor according to claim 1.

5. An electrically driven pump comprising:
a pump rotor having a plurality of teeth connected to a drive shaft of an electrically driven motor and which converts a transmitted torque into a fluid discharge work, and
the electrically driven motor according to claim 1.

6. An electrically driven pump comprising:
a pump rotor having a plurality of teeth connected to a drive shaft of an electrically driven motor and which converts a transmitted torque into a fluid discharge work, and
the electrically driven motor according to claim 2.

7. The electrically driven motor according to claim 1, wherein each of the plurality of rotor teeth are made of a magnetic material.

* * * * *